Figure 1:
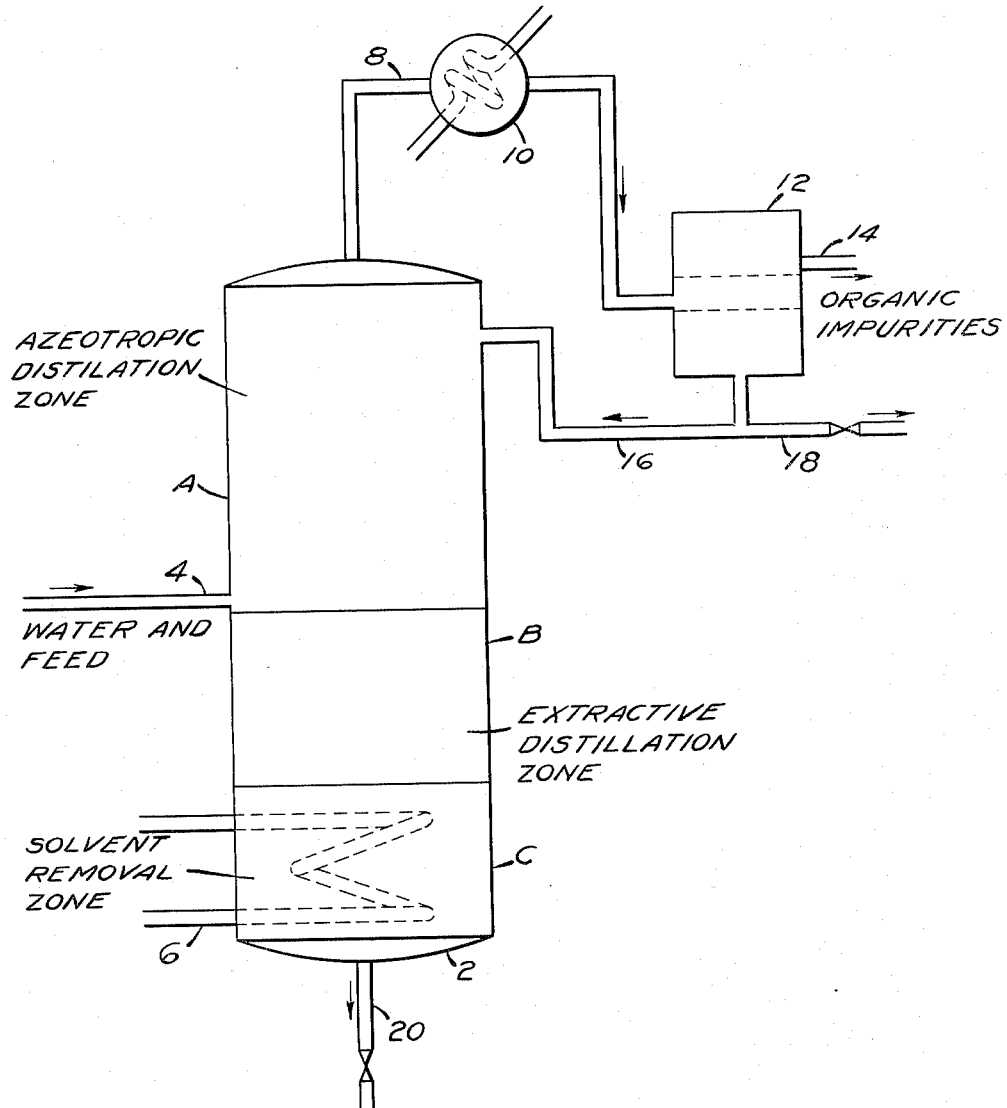

United States Patent Office 3,214,347
Patented Oct. 26, 1965

3,214,347
AZEOTROPIC DISTILLATION PROCESS
Howard Grekel and Karol L. Hujsack, Tulsa, Okla., Theodore Q. Eliot, deceased, late of Princeton, N.J., by Norma Jean Eliot, executrix, Tulsa, Okla., John J. Hagan, Lake Charles, La., and James J. Hainbach, Houston, Tex., assignors to Pan American Petroleum Corporation, Tulsa, Okla., a corporation of Delaware
Continuation of application Ser. No. 799,403, Mar. 13, 1959. This application Nov. 18, 1963, Ser. No. 324,587
17 Claims. (Cl. 202—39.5)

This is a continuation of our co-pending application Serial No. 799,403, filed March 13, 1959, which, in turn, is a continuation-in-part of U.S. Serial No. 392,004, filed November 13, 1953, now abandoned.

Our invention relates to a novel method for purifying certain organic chemicals by means of an improved distillation technique. More particularly, it is concerned with a procedure for purifying such chemicals substantially miscible in the azeotroping agent employed—such as, for example, water-miscible carboxylic acids which form azeotropes with water.

While it is to be strictly understood that the process of our invention is applicable to a wide range of chemical mixtures, it is considered desirable for the purpose of teaching specific embodiments thereof to limit the present detailed description to the separation and purification of the various water-miscible carboxylic acids.

In the production of chemicals of the type suitable for purification by the process of our invention—such as, for example, propionic, n-butyric and isobutyric acids — various impurities are found associated therewith which cannot be removed therefrom by simple methods of distillation. While the nature of these impurities may vary with the method by which the acids are synthesized, the problem of purifying these acids is essentially the same, regardless of the source from which they are derived. In the case of the acids mentioned above, the impurities generally consist of sparingly water-soluble carbonyl compounds and higher-boiling esters, although various hydrocarbons and other classes of compounds having a limited solubility in water and possessing boiling points close to those of the acids to be purified may also be present to complicate the purification procedure. An additional factor tending to render more complex the problem of acid purification is the relatively rigid purity specifications set up by the industry with respect to such acids, as well as other organic chemicals now in wide volume use. Thus, for example, unless n-butyric acid can be obtained in the state of 99 percent purity or higher, this product generally has very little, if any, marketability.

Included among the various purification methods previously employed for the purpose of purifying acids of the type contemplated by our invention are vacuum distillation, liquid-liquid extraction and ordinary azeotropic distillation. With vacuum distillation, it was found that acids having a purity not in excess of about 98 percent were obtained. However, the percentage recovery of acids from the crude feed containing 4 to 5 percent impurities was not good and ranged from about 46 to about 87 percent, with the higher purity acids being obtained at the lower recoveries. In the case of liquid-liquid extraction of a stream containing an impure mixture of both water-miscible and water-immiscible acids, using water as the solvent, water-miscible acids of limited purity and poor color were obtained, the maximum purity being 98.4 percent. Employing ordinary azeotropic distillation of these acids with water, either batchwise or continuously, the recovery of the acids is only about 60 to 70 percent, and the purity thereof in the case of the continuous procedure is about 98 percent (substantially no improvement over purity of feed), while the purity obtained by the batch distillation method is about 99 percent.

Accordingly, it is an object of our invention to provide a method capable of producing acids of the aforesaid type having a purity of at least 99 percent, and to recover said acids in yields substantially greater than those which have been secured in the past. It is another object of our invention to provide a process for the purification of the aforesaid acids by means of azeotropically distilling out the impurities therein in the presence of water wherein very little—if any process water need be added during the operation after steady-state conditions have been established in the system. It is still another object of our invention to provide a method whereby such purification is effected in a distillation column wherein application is made within said column of both extractive distillation and azeotropic distillation phenomena. It is still a further object of our invention to provide a method whereby chemicals other than the acids herein defined may be purified in accordance with the novel procedures described and claimed below.

In accordance with one embodiment of our invention, water (solvent) is added to the distillation column and the latter operated initially under total reflux. After this condition has been created within the column, the crude acid or crude mixture of acids is added. Overhead a distillate rich in water is withdrawn from the system in an amount corresponding to the volume of feed added until the temperature at the base of the column reaches the boiling point of the substantially anhydrous acid or of the substantially anhydrous mixture. During this period no stream is withdrawn from the bottom of the column. Also, in some instances—depending upon the nature of the impurities present—a distillate organic layer will be observed to form before the aforesaid temperature conditions are reached. Once the desired temperature at the base of the column has been reached, a substantially pure acid is withdrawn from the bottom of the column and feed is added in an amount corresponding approximately to the volume of purified acid removed. Overhead a two-phase distillate is obtained, an upper organic layer consisting of impurities—together with a small quantity (5 or 6 percent, based on the acid charged) of solubilized acid—and a lower water layer containing acid dissolved therein. The upper organic layer is removed from the system, while the aforesaid aqueous layer is returned to the top of the column as reflux. The point in the column at which the make-up water is added is immaterial as long as it is not introduced at a level so low in the column that it will interfere with the production of substantially dry acid at the base of the column.

By admitting water to the column and operating initially under total reflux, as described above, the use of additional process water can be virtually eliminated even if the feed employed is absolutely dry. Actually, under such conditions the only water that need be added to the system is an amount corresponding to the volume dissolved in the distillate organic layer which is being continuously removed.

With respect to the acid being purified under the above-mentioned conditions of operation, the action within the column is substantially that of extractive distillation below the point at which the feed is introduced, with negligible consumption of solvent, while above the feed point the action is essentially azeotropic distillation. Thus, to maintain these conditions throughout the column the temperature employed in the extractive distillation and azeotropic distillation zones should be approximately that of the lowest boiling acid-solvent azeotrope, while the temperature at the bottoms outlet of the column is the boiling point of the substantially dry acid or mixture of dry acids being purified. Also, in this connection it should be pointed out that in the solvent removal zone (to be more specifically defined below) the temperature at a point within said zone should be between the boiling point of water (solvent) and the boiling point of the dry acid or acids in the bottom of the column. Thus, in the case of n-butyric acid the temperature at a point within the aforesaid solvent removal zone would be about 130° C. (corrected to atmospheric pressure). Once such condition is achieved within this solvent removal zone, we have observed that the other required conditions of operation are substantially automatically set.

When employing a feed containing propionic and n-butyric acid, the latter should be present in a concentration of at least about 25 weight percent and preferably in concentrations of at least about 50 weight percent. This is for the reason that the ratio of n-butyric acid to propionic acid in the distillate organic layer is considerably greater than the ratio of these components in the feed. Thus, in normal operation of our process, with a feed predominating in butyric acids, from about 5 to 6 percent of the total $C_4$ acids present in the feed pass into the layer of organic impurities which is removed from the system. Obviously then, if an appreciable recovery of n-butyric acid is to be realized, the crude feed containing the mixture of acids should have initially a substantial concentration of n-butyric acid. The heat input employed at the base of the column is preferably the minimum amount required to take overhead sufficient impurities to yield a product acid of the desired purity. Contrary to the usual circumstances in separation of this type, the use of a high reflux ratio in the process of our invention is generally considered undesirable when the distillate obtained is heterogeneous for the reason that to maintain such a condition would require bringing overhead relatively large volumes of acid, which in turn would result in relatively heavy acid losses owing to the increased solution of acid into the distillate organic layer—the latter being continuously removed from the system.

While we ordinarily prefer to employ the process of our invention by starting the operation with the distillation column under total aqueous reflux, as previously described, it is not absolutely essential that this procedure be followed in order to obtain the beneficial results made possible by our invention. For example, if desired, our invention may be employed by having the distillation column first charged with crude acid, after which water may be added thereto while bottoms are removed under conditions of total reflux until the desired conditions previously referred to are reached. However, in certain cases, even after the desired temperatures are obtained within the column, acids containing an appreciable quantity of impurities are withdrawn from the bottoms fraction and of course must be recycled back to the feed. Accordingly, a relatively long period of operation is required under such conditions before high purity acids can be withdrawn from the distillation column bottoms.

Some of the more outstanding advantages of the above-described embodiment of our invention are, as previously mentioned, that the use of process water after steady-state conditions are reached can be substantially eliminated while making available within the column the benefits of both extractive and azeotropic distillation with water or other suitable solvent. Moreover, by our invention it is now possible to accomplish—through continuous distillation—superior purification of a substance or substances which could not be purified to such a high degree by means of batch operation without the use of excessive volumes of water, which in turn would bring about prohibitive losses of acid carried out of the system with the discarded fraction containing the bulk of the impurities. Also, the general method of continuous azeotropic distillation with water or other suitable solvent, as taught herein, wherein the concentration of water on all but a few bottom plates of the column is maintained at a high level is applicable to any type of chemical or mixture of chemicals which meet certain general requirements hereinafter outlined in detail.

In this connection, it should be pointed out that the process of our invention differs materially from ordinary azeotropic distillation methods. Thus, in azeotropic distillation, the solvent added to form the azeotrope with the impurity steadily decreases in concentration downward from the feed plate. Therefore, since the ability of the solvent to increase the volatility of the impurity relative to the chemical to be purified is proportional to solvent concentration, efficiency of impurity removal decreases with each succeeding plate below the feed point.

In contrast, the process of the present invention establishes initially the required solvent concentration to obtain the desired relative volatility between impurity and chemical or chemicals to be purified and prevents the decrease of solvent concentration below the feed point for a sufficient number of plates to permit removal of the impurity to the extent desired. In this connection, the concentration of solvent required to secure the desired relative volatility between said impurity and chemicals is generally hereinafter referred to as a "relatively high and constant concentration." The portion of the column in which these conditions exist is termed the extractive distillation zone. In terms of a numerical range, the solvent concentration on the plates in this zone varies from about 40 to 90 mol percent, or slightly higher. Generally, solvent concentrations of about 60 to 80 mol percent are preferable.

The separation effected by the process of our invention can also be accomplished by ordinary extractive distillation methods. However, in the case of extractive distillation the solvent is employed in quantities many times greater than the chemical to be purified and, in addition, a separate distillation step is required after impurities have been removed from the chemical in order to recover solvent from the chemical. It is apparent in operations of this type that circulation of large volumes of solvent relative to the quantity of chemical treated is required. Also, sizable quantities of make-up solvent must be added, either in the form of reprocessed or fresh solvent.

To apply the process of our invention to an impure compound or mixture of impure compounds not separable by ordinary fractional distillation methods and wherein a procedure less expensive than extractive distillation is desired, the solvent should be selected in accordance with the following requirements for operation of the column where it is "choked" with solvent in order to fulfill the needs within the three adjacent zones of the column. The first of these zones, i.e., the solvent removal zone, constitutes the lower portion of the column, while the second or extractive distillation zone extends from the top of the solvent removal zone up to the feed plate. The third zone extends from the feed plate to the top of the column, and is referred to as the azeotropic distillation zone.

In employing the process of our invention, the solvent should be substantially lower-boiling than the chemical to be purified, and should form a minimum boiling azeotrope with the impurities to be removed. The solvent may form a minimum boiling azeotrope with the chemical to be purified, in which case the solvent concentration in the azeotrope should be sufficient to cause the impurity to have a substantially high volatility relative to the chemical or chemicals to be purified, and the latter should be soluble in the solvent—at least in a concentration corresponding to the percentage of the chemical or chemicals in the solvent-chemical azeotrope. In this connection, it is to be strictly understood that the expression "substantially miscible," as used in the present description with reference to the miscibility of the chemical or chemicals in the solvent, is to be interpreted in light of the preceding definition of solubility of the chemical in the solvent. If the solvent does not form an azeotrope with the chemical to be purified, the two should be miscible to a high degree and preferably should be miscible in all proportions. Such solubility requirements are desirable to avoid the presence of a heterogeneous mixture in the extractive distillation zone of the column, inasmuch as heterogeneity tends to prevent an increase of the relative volatility between the impurity and chemical to be purified as the solvent concentration is increased. Whether the solvent and chemical to be purified form a minimum boiling azeotrope or not, two other variations of applicable systems are possible, i.e., the solvent-impurity azeotrope may be homogeneous or heterogeneous. Accordingly, under such conditions we have found it possible to apply the process of our invention to the separation and purification of the major components of four distinct systems differing in the relationship of solvent, impurity and chemical to be purified. Thus, for example, in Case I, the solvent and chemical to be purified form a minimum boiling azeotrope which boils substantially higher than the azeotrope of the impurity with the solvent and the solvent-impurity azeotrope is homogeneous. In this case the chemical to be purified can be completely recovered in the bottoms by aqueous fractionation, and the solvent consumption is proportional to the amount of impurity and the composition of the solvent-impurity azeotrope. In Case II the solvent forms a minimum boiling azeotrope with the chemical to be purified, and the minimum boiling azeotrope of solvent with impurity is hetergeneous. In this system the consumption of solvent can be reduced below that required in Case I because solvent can be preferentially refluxed to the column. If the solvent-impurity azeotrope does not boil substantially lower than the azeotrope of the solvent with the chemical to be purified, some chemical will be lost with the impurity in the distillate but most of the chemical to be purified will be refluxed with the solvent layer. If the minimum boiling solvent-impurity azeotrope boils substantially lower than the solvent-chemical azeotrope, all of the chemical to be purified can be recovered in the bottoms by adequate fractionation. With the system concerned in Case III, the solvent and chemical to be purified do not form an azeotrope and the minimum boiling solvent-impurity azeotrope is homogeneous and boils substantially lower than the pure solvent. Under such circumstances the chemical to be purified can be completely recovered in the bottoms by adequate fractionation, but the solvent consumption is proportional to the amount of impurity and the composition of the solvent-impurity azeotrope. With the system involved in Case IV, the solvent does not form an azeotrope with the chemical to be purified and the solvent-impurity azeotrope is heterogeneous. In this case the consumption of solvent is reduced below that of Case III because the solvent can be preferentially refluxed to the column. Also, it is to be pointed out that while the use of relatively low reflux ratios are desirable in cases such as II and IV, as previously mentioned, high reflux ratios are preferred where the distillate is homogeneous, e.g., Cases I and III cited above. In the separation of mixtures such as those typified by Cases II and IV, it is to be specifically understood that the concentration of solvent-immiscible impurity present in the feed should be insufficient to cause the formation of two distinct phases on the plates of the distillation column. Otherwise, the effectiveness of the process of our invention is greatly diminished, owing to the tendency of the chemical to be purified to pass into the impurity layer.

In instances covered by Case II mentioned above, it may sometimes be possible to operate efficiently with an azeotropic distillation zone consisting merely of a hollow shell. Thus, for example, in instances where there is only one chemical to be purified—or where it is relatively unimportant which of two or more chemicals to be purified is selectively lost into the distillate organic layer—the presence of an efficient rectification zone above the feed point is unnecessary.

Typical examples of mixtures which may be separated by means of the above alternate methods of application of our invention are given in the table below.

TABLE

|  | Case I | Case II | Case III | Case IV |
|---|---|---|---|---|
| Solvent | Ethanol | Water | Acetone | Water. |
| Boiling Point, ° C | 78.3 | 100.0 | 56.2 | 100.0. |
| Chemical to be Purified | 2 Pentanone | n-Butyric Acid | Butyraldehyde | Ethylene Glycol. |
| Boiling Point, ° C | 102.0 | 164.0 | 74.8 | 197.4. |
| Azeotrope with solvent: |  |  | None | None. |
| Boiling Point, ° C | 77.7 | 99.4 |  |  |
| Wt. Percent Solvent | 91.2 | 81.5 |  |  |
| Azeotrope with impurity |  | None |  | Unknown. |
| Boiling Point, ° C | 93.2 |  | 62.6 |  |
| Wt. Percent Impurity | 66 |  | 51 |  |
| Solubility in solvent at 20° C., Wt. Percent. | Infinite | Infinite | Infinite | Infinite. |
| Impurity | n-Heptane | Isoamyl Propionate | Methanol | 2-ethylbutyl Cellosolve. |
| Boiling Point, ° C | 98.4 | 160.3 | 64.5 | 196.8. |
| Azeotrope with solvent: |  |  |  |  |
| Boiling Point, ° C | 70.9 | 96.6 | 55.7 | Ca. 99.3. |
| Wt. Percent Solvent | 49 | 48 | 88 | Ca. 18. |
| Solubility in solvent at 20° C., Wt. Percent. | 56 | 0.09 (25° C.) | Infinite | 1.2. |

The process of our invention as applied to the purification of water-miscible aliphatic acids may be more readily understood by reference to the accompanying flow diagram wherein water is first fed into column 2 through line 4 and heat supplied by reboiler 6 to bring the system under total aqueous reflux. Thereafter, n-butyric acid of 96 percent purity and containing as principal contaminants isoamyl propionate and hexyl acetate is added to the column through line 4. Overhead a distillate rich in water is withdrawn from the system in an amount corresponding to the volume of feed added, with nothing being withdrawn from the bottoms until the temperature near the center of the generally designated solvent removal zone C reaches a level of about 130° C., corrected to atmospheric pressure. Thereafter, the overhead brought through line 8 and condenser 10 is introduced into separator 12, where the distillate stratifies into two layers. The upper organic layer containing the bulk of the impurities, together with solubilized water and n-butyric acid, is withdrawn from the system through line 14. The distillate aqueous layer containing n-butyric acid and substantially no impurities is returned as reflux to the column through line 16. In case a wet feed is used, an amount of water corresponding to the volume of water entering the system, less the water in the impurity layer, is withdrawn through line 18. Under the above conditions of operation, dry n-butyric acid having a purity in excess of 99 percent is withdrawn from the bottom of the column through line 20.

The process of our invention will be further illustrated by the following specific examples.

*Example I*

An aqueous mixture of crude acids* containing .4 percent acetic acid, 5.2 percent propionic acid, 9.2 percent isobutyric acid, 36.8 percent n-butyric acid, 46.5 percent impure $C_5$ and higher acids, and 1.9 percent of non-acid organic impurities boiling in the range of the iso and n-butyric acids is subjected to distillation in a conventonal fractionation column. The temperature employed at the bottom of the column is about 175° C. (440 mm.) and the top tower temperature is about 132° C. (300 mm.). The crude acid mixture is fed to the column at the rate of 2625 pounds per hour, together with 300 pounds per hour of recycled bottoms from the product n-butyric acid column as described below. Under these conditions, and at a reflux ratio of about 10 to 1, a distillate is withdrawn at a rate of 1685 pounds per hour. From the base of the column $C_5$ and higher acids, together with non-acid impurities, are removed at the rate of 1240 pounds per hour. This stream contains approximately 2 percent of the n-butyric acid present in the original feed. A second column containing only water is then started up under total reflux, after which the aforesaid distillate is used as feed. Water is removed from the column under refluxing conditions until the temperature at a point in the solvent removal zone in the lower part of the fractionating tower reaches a value of about 130° C. (corrected to atmospheric pressure). The temperature at the base of the column is about 164° C. 940 mm.) and the top tower temperature is 100° C. (760 mm.). Distillate is brought overhead, cooled to about 52° C. and allowed to stratify into an upper organic layer consisting essentially of impurities, together with dissolved acids, and a lower aqueous layer containing water-soluble acids. The organic layer is removed from the system at the rate of 145 pounds per hour and contains 4.0 percent of the n-butyric acid present in the aforesaid original feed. The lower aqueous layer is refluxed back to the distillation column. At a point below the feed and above the solvent removal zone, water is introduced at a rate of 25 pounds per hour in order to compensate for the quantity of water removed from the system via the aforesaid organic layer. From the bottom of the tower a substantially dry stream (0.5 weight percent water) of water-soluble $C_2$–$C_4$ acids free from non-acid impurities is withdrawn at the rate of 1565 pounds per hour.

To obtain highly purified n-butyric acid from the dry acid mixture mentioned immediately above, said mixture is fed to a third column operated at a bottoms temperature of 157.8° C. (635 mm.) and at a top tower temperature of 138.9° C. (500 mm.). A reflux ratio ranging from about 15 to 1 to 23 to 1 is employed. Overhead a stream is withdrawn at the rate of 375 pounds per hour and contains 2.4 percent of the n-butyric acid present in the aforesaid original feed. From the bottom of the column a stream is withdrawn at the rate of 1145 pounds per hour and consists essentially of n-butyric acid. This stream is subjected to further fractionation at a bottoms temperature of 172.2° C. (910 mm.) and at a top tower temperature of 163.3° C. (760 mm.). The reflux ratio in operating this column ranges from 10 to 1 to 20 to 1. Overhead product n-butyric acid is obtained in 99.2 percent purity, boiling at 162°–164.2° C. and having a color (APHA scale) of 5. The n-butyric acid thus obtained is removed as distillate at the rate of 890 pounds per hour, while the bottoms fraction from this column is withdrawn at the rate of 300 pounds per hour and recycled to the original aqueous stream of crude acid feed. Based on the quantity of n-butyric acid present in the original feed, 93.8 percent of the n-butyric acid is recovered by this process.

The following example is included for the purposes of distinguishing the process of our invention over ordinary azeotropic distillation, even with an excess amount of azeotroping agent or entrainer being employed in the latter case.

*Example II*

The distillation column employed in these runs is a 55 plate Oldershaw glass column, 1-inch I.D. with a reboiler capacity of 280 cc. fitted for continuous draw-off of bottoms. The condenser has a distillate decanter equipped to handle separately the upper organic layer and the lower water layer. All lines used are either polyethylene or glass tubing and the pumps employed are of stainless steel.

The acid used in these experiments is n-butyric acid, Fischer Scientific Company, technical grade, 99.1 weight percent purity, to which is added sufficient butyl butyrate to give a concentration of 4.5 weight percent of non-acid impurities in the feed stock.

In carrying out the process of the present invention, the glass pot attached to the distillation column is charged with 280 ml. of the n-butyric acid, used to make up the feed, together with 60 ml. of distilled water. The column is then placed on total reflux with the automatic overflow line from the reboiler being closed. The boil-up rate is adjusted until the total distillate rate is about 222 ml. per hour, as determined by shutting off the reflux for short periods of time and measuring the liquid accumulation in the calibrated decanter. Water is added to, or distillate water layer withdrawn from the system as necessary to obtain a pot vapor temperature of 156° C. When the boil-up rate and control temperature are as specified, the bottoms overflow line is opened and the acid and water feeds are then introduced into the column as shown in the table below. Thereafter, the boil-up rate is adjusted and checked periodically to obtain the desired rate of total water layer overhead. Water feed rate is adjusted to maintain the control temperature (156° C.) just above the reboiler.

In a second run, referred to in the table below as Run B, feed similar to that mentioned above was used and the butyric acid purified under conventional azeotropic distillation conditions. In this connection, feed having the composition of that used in Run A is diluted with sufficient water to give the final composition listed in the table. In starting up Run B, the procedure is the same as in Run A except the column and reboiler hold-up already in place, is used. Water layer distillate is withdrawn until the control temperature of 158.0° C. on plate 30 of the column is obtained. Thereafter, the acid and water feeds are introduced at plate 40 and the reboiler overflow line is opened. After steady state conditions are reached, a sample of the liquid on plate 30 is taken.

---

* Percent by weight on dry basis.

The operating conditions employed and the results obtained are shown in the table below:

TABLE

| Operating Conditions—Rates—Grams per Hour | Run A | | | Run B | | |
|---|---|---|---|---|---|---|
| Feed | 323.2 | | | 352.9 | | |
| Distillate Product—Withdrawn: | | | | | | |
| Organic Layer | 26.7 | | | 21.6 | | |
| Water Layer | 0 | | | 46.4 | | |
| Bottoms | 308.8 | | | 306.3 | | |
| Reflux (including internal reflux) | 222.5 | | | 197.4 | | |
| | Butyric Acid | Non-acids | Water | Butyric Acid | Non-acids | Water |
| COMPOSITION, WT. PERCENT | | | | | | |
| Feed | 95.0 | 4.5 | 0.5 | 84.3 | 4.0 | 11.7 |
| Distillate Organic Layer | 41.4 | 53.1 | 5.5 | 48.5 | 44.8 | 6.7 |
| Distillate Water Layer | | | | 9.5 | 2.4 | 88.1 |
| Reflux | All of water layer | | | 9.5 | 2.4 | 88.1 |
| Bottoms | 99.2 | 0.5 | 0.25 | 97.4 | 2.5 | 0.11 |
| Plate 30 liquid | 58.9 | 2.1 | [1] 39.0 | | | [1] 1.3 |
| COLUMN CONDITIONS | | | | | | |
| Barometric Pressure (top column), mm. Hg | 741.4 | | | 754.6 | | |
| Temperature, °C.: | | | | | | |
| Plate 55 vapor | 99.0 | | | 99.5 | | |
| Plate 40 (feed point vapor) | 99.0 | | | 99.5 | | |
| Plate 30 vapor [2] | 98.5 | | | 158.0 | | |
| Pot vapor | 156.0 | | | 164.0 | | |
| Pot liquid | 163.5 | | | 166.5 | | |
| MATERIAL BALANCES | | | | | | |
| Acid as butyric | 104 | | | 98 | | |
| Nonacids by difference | 109 | | | 126 | | |
| Water | 139 | | | 103 | | |
| Distribution of pure n-butyric acid, percent in bottoms | 97 | | | 95 | | |

[1] In Run A corresponds to 76.0 mol percent and in Run B corresponds to 6.0 mol percent.
[2] Tenth plate below the feed plate.

Butyric acid and water form an azeotrope boiling at 99.4° C. with 81.5 weight percent of the azeotrope being water. Butyl butyrate and water form an azeotrope boiling at 97.2° C. Water constitutes 53 weight percent of this azeotrope.

As will be seen from the example immediately above, azeotropic distillation was carried out in the presence of three times the amount of water theoretically required to form an azeotrope with the butyl butyrate present. The purity of the butyric acid obtained by the azeotropic method was 97.4 weight percent and the yield of butyric acid (recovered as bottoms) having this purity was 95.0 weight percent. It will also be noted from the information in the example, that to get these results more then twenty times the amount of water was necessary over that required by the process of this invention, i.e., 0.5 weight percent in Run A vs. 11.7 weight percent in Run B. Moreover, it will be noted, and this is important, that the butyric acid purified by the azeotropic method did not even make commercial specifications of 99 weight percent minimum purity. See Carbide and Carbon Chemical Company's Catalogue on Organic Acids, page 23, published 1955.

On the other hand, by the process of this invention it is seen that the butyric acid recovered had a purity of 99.2 weight percent and was obtained in 97.0 weight percent yield. In securing these results, it should also be emphasized that only one-fourth of the amount of water required to azeotrope with the impurity, was used.

It should also be pointed out that in Run A, about 90 weight percent of the impurities originally present were removed, whereas less than 40 weight percent of the impurities were removed from the butyric acid when purified in accordance with the azeotropic method (Run B).

The differences in results obtained in Runs A and B are striking, to say the least, and point to the fact that the two procedures must be fundamentally different. One indication that this is true is seen from the composition of the samples taken from the column at the tenth plate below the feed plate, i.e., plate 30. In the case of the azeotropic run, i.e., Run B, the water content of the sample taken from the tenth plate below the feed was 6.0 mol percent, whereas the sample from the same plate of the column, when operating under the conditions of the present invention, was found to contain 76.0 mol percent water. It is apparent that the Run A conditions in this part of the column provide for better separation of impurities from the chemical or chemicals to be purified than the azeotropic method provided, even with excessive amounts of entrainer present in the latter case.

Figure 2:
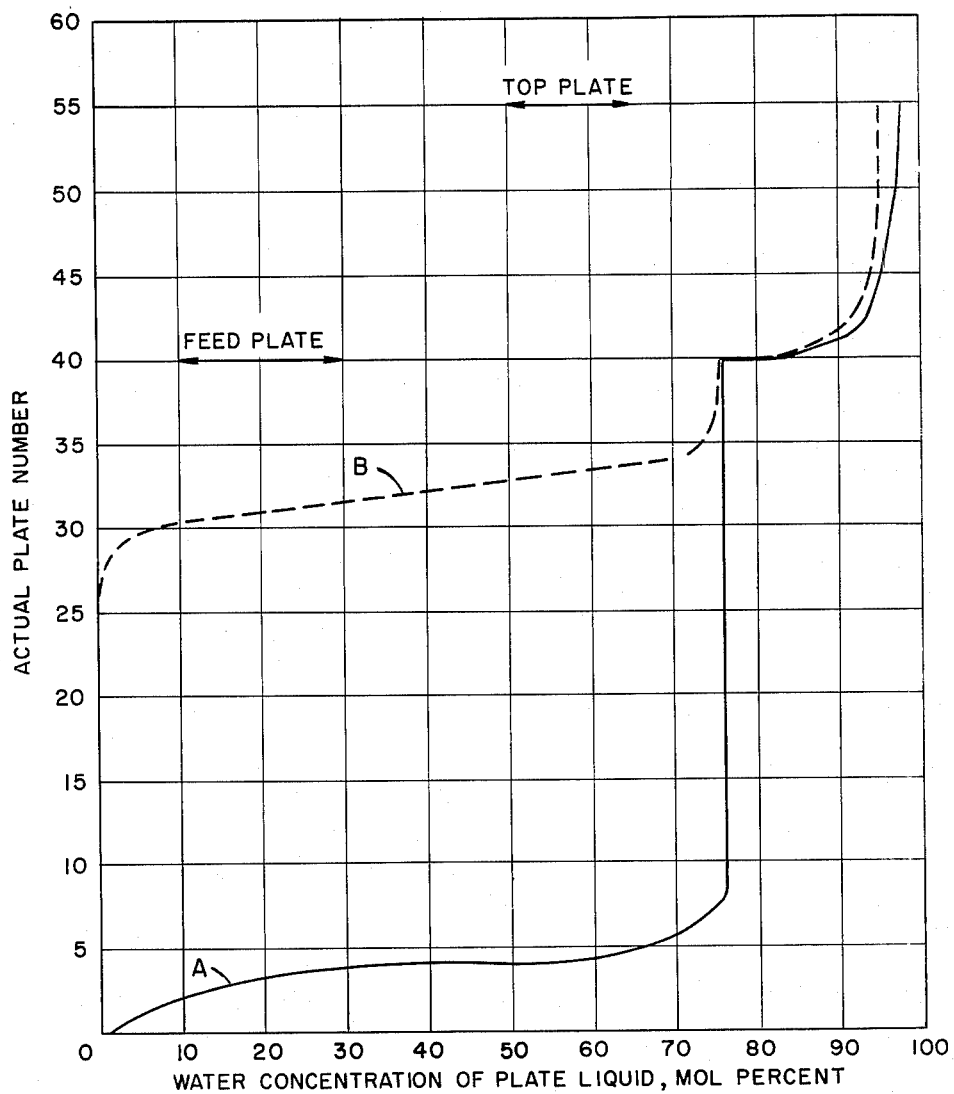

The conditions prevailing within the column in Runs A and B mentioned above, are further illustrated by reference to the curves in FIGURE 2 showing the water (solvent) concentration or distribution in the column during each of these runs. Thus, in Run A, the mol percent water on the plates of the distillation column is indicated by curve A. It will be noted that in this run the mol percent water found on about the second plate from the bottom to plate 6, ranged from about 10 to about 70 mol percent. From plates 8 to 40, the concentration of water on the plates was 76 mol percent. Above plate 40, i.e., the feed plate, this concentration increased to a maximum of about 98 mol percent at plate 55. On the other hand, curve B indicates the distribution of water below the feed plate where ordinary azeotropic distillation was employed together with an excess of entrainer. Thus, in the latter run, the concentration of water on plate 30, i.e., the tenth plate below the feed plate, was 6 mol percent. Below plate 30, the mol percent water on the plates was insignificant. While curve B shows that the concentration of water below the feed plate ran as high as about 75 mol percent, such a high concentration of water was found only three or four plates below the feed. In other words, in Run B, although relatively high concentrations of water were found below the feed plate, such concentrations did not extend beyond plate 30, i.e., beyond the tenth plate below the feed. From these results it is clearly apparent that the conditions afforded by the process of this invention (Run A) for the separation of liquids boiling very close to one another, are distinctly more favorable than the conditions provided by the prior art process (Run B). This is true for the reason that by the process of our invention it is possible to maintain high concentrations of solvent throughout a much greater portion of that part of the distillation column extending from the feed plate to the reboiler zone than can be achieved in conventional azeotropic distillation. The unusually high concentration of solvent in the aforesaid part of the distillation column tends to spread apart to a much greater degree the relative volatilities of the components being separated, thereby rendering much easier purification of the desired chemical.

It is to be strictly understood that the foregoing description and examples are merely illustrative of the process of our invention and are to be in no way considered as limiting the scope thereof. It will be apparent to those skilled in the art that our invention is susceptible of numerous variations and modifications. Thus, for example, instead of introducing make-up water in the principal purification step at a level in the column below the feed point, this stream may, if desired, be returned to the system by combining it with the feed, thereby eliminating the need for additional equipment for a separate feed point and permitting greater ease in over-all operation of the column. Likewise, in order to improve the permanganate time of the product acids, it may be desirable to add a suitable oxidizing agent, for example, potassium permanganate, to the acids being purified prior to the final distillation step. Addition of the oxidizing agent is preferably effected when the acid mixture to be purified is cool, for example 25° to 40° C., so that a minimum amount of the acid will be attacked by the oxidizing agent. Also, it is preferred to allow the oxidizing agent to remain in contact with the cool acid mixture for several hours prior to distillation.

In general, it may be said that the process of our invention is applicable to the separation and purification of any mixture of chemicals not separable by ordinary fractional distillation, the solvent used in our process being chosen in accordance with the requirements hereinabove set forth. Also, it is to be understood that while the process of our invention is ordinarily effected at atmospheric pressure, it may, likewise, be employed at superatmospheric pressure or under vacuum.

We claim:

1. In a process for the separation and purification of the components of a mixture of a normally liquid organic chemical containing impurities, which mixture cannot be satisfactorily separated and purified by simple fractionation methods, the improvement which comprises introducing said mixture and a solvent for said chemical into a distillation column having the following zones therein, said solvent being substantially inert with respect to the components of said mixture:

an azeotropic distillation zone extending from the feed plate of said column to the top thereof;

an extractive distillation zone extending from the feed plate down to a lower level of said column but above the reboiler section thereof; and a solvent removal zone, the upper boundary of which is adjacent the lower limit of said extractive distillation zone and the lower boundary of said solvent removal zone being the base of said column, the solvent employed being lower boiling than the chemical to be purified, and forming a minimum boiling azeotrope with said impurities, said solvent also being capable of forming an azeotrope with said impurities lower boiling than any other distillable fraction of said mixture having at least one component, the concentration of the solvent in said solvent-impurities azeotrope being sufficient to cause said impurities to have a high volatility relative to said chemical;

establishing, prior to the withdrawal of pure chemical from the lower portion of said solvent removal zone, and maintaining from plate to plate a substantially constant concentration of liquid solvent on a majority of the plates in said extractive distillation zone, said concentration being in the range of from about 40 to about 90 mol percent;

maintaining at a point within said solvent removal zone a temperature above the boiling point of said solvent but below the boiling point of the solvent-free chemical so that solvent-free chemical is produced as bottoms;

removing overhead from the azeotrope distillation zone a distillate of the solvent-impurities azeotrope;

after said concentration has been established, adding solvent to said column in an amount corresponding substantially to the volume of said solvent dissolved in the impurities in said distillate; and withdrawing from the bottom of said solvent removal zone a stream of said chemical substantially free of said impurities and solvent.

2. In a process for the separation and purification of the components of a mixture of a normally liquid organic chemical containing impurities, which mixture cannot be satisfactorily separated and purified by simple fractionation methods, the improvement which comprises introducing said mixture and a solvent for said chemical into a distillation column having the following zones therein, said solvent being substantially inert with respect to the components of said mixture:

an azeotropic distillation zone extending from the feed plate of said column to the top thereof;

an extractive distillation zone extending from the feed plate down to a lower level of said column but above the reboiler section thereof; and a solvent removal zone, the upper boundary of which is adjacent the lower limit of said extractive distillation zone and the lower boundary of said solvent removal zone being the base of said column, the solvent employed being lower boiling than the chemical to be purified and forming a minimum boiling azeotrope with said impurities, but not forming an azeotrope with said chemical, the concentration of the solvent in said solvent-impurities azeotrope being sufficient to cause said impurities to have a high volatility relative to said chemical, the latter being miscible in all proportions with said solvent in said extractive distillation zone;

establishing, prior to the withdrawal of pure chemical from the lower portion of said solvent removal zone, and maintaining from plate to plate a substantially constant concentration of solvent on a majority of the plates in said extractive distillation zone, said concentration being in the range of from about 40 to about 90 mol percent;

maintaining at a point within said solvent removal zone a temperature above the boiling point of said solvent but below the boiling point of the solvent-free chemical so that solvent-free chemical is produced as bottoms;

removing overhead from the azeotropic distillation zone a distillate of the solvent-impurities azeotrope;

after said concentration has been established, adding solvent to said column in an amount corresponding substantially to the volume of said solvent dissolved in the impurities in said distillate; and withdrawing from the bottom of said solvent removal zone a stream of said chemical substantially free of said impurities and solvent.

3. In a process for the separation and purification of the components of a mixture of a normally liquid organic chemical containing impurities, which mixture cannot be satisfactorily separated and purified by simple fractionation methods, the improvement which comprises introducing said mixture and a solvent for said chemical into a distillation column having the following zones therein, said solvent being substantially inert with respect to the components of said mixture:

an azeotropic distillation zone extending from the feed plate of said column to the top thereof;

an extractive distillation zone extending from the feed plate down to a lower level of said column but above the reboiler section thereof; and a solvent removal zone, the upper boundary of which is adjacent the lower limit of said extractive distillation zone and the lower boundary of said solvent removal zone being the base of said column, the solvent employed being one which forms a minimum boiling azeotrope with the chemical to be purified and in which said impurities are substantially immiscible, said solvent also being capable of forming an azeotrope with said impurities lower boiling than the lowest boiling azeotrope of said solvent with said chemical, the concentration of the solvent in said solvent-impurities azeotrope being sufficient to cause said impurities to have a high volatility relative to said chemical, the latter having a solubility in said solvent corresponding at least to the percentage of said chemical in said solvent-chemical azeotrope;

establishing, prior to the withdrawal of pure chemical from the lower portion of said solvent removal zone, and maintaining from plate to plate a substantially constant concentration of solvent on a majority of the plates in said extractive distillation zone, said concentration being in the range of from about 40 to about 90 mol percent;

maintaining at a point within said solvent removal zone a temperature above the boiling point of said solvent but below the boiling point of the solvent-free chemical so that said chemical is produced as bottoms;

removing overhead from the azeotrope distillation zone a distillate of the solvent-impurities azeotrope, allowing said distillate to stratify into two layers and returning the solvent layer to said azeotropic distillation zone; after said concentration has been established adding solvent to said column in an amount corresponding substantially to the volume of said solvent dissolved in the impurities layer of said distillate; and withdrawing from the bottom of said solvent removal zone a stream of said chemical substantially free of said impurities and solvent.

4. In a process for the separation and purification of the components of a mixture of a normally liquid organic chemical containing an impurity, which mixture cannot be satisfactorily separated and purified by simple fractionation methods, the improvement which comprises introducing said mixture and a solvent for said chemical into a distillation column having the following zones therein, said solvent being substantially inert with respect to the components of said mixture:

an azeotropic distillation zone extending from the feed plate of said column to the top thereof;

an extractive distillation zone extending from the feed plate down to a lower level of said column but above the reboiler section thereof; and a solvent removal zone, the upper boundary of which is adjacent the lower limit of said extractive distillation zone and the lower boundary of said solvent removal zone being the base of said column, the solvent employed being one which forms a minimum boiling azeotrope with the chemical to be purified and in which said impurity is miscible, said solvent also being capable of forming an azeotrope with said impurity lower boiling than the lowest boiling azeotrope of said solvent with said chemical, the concentration of the solvent in said solvent-impurity azeotrope being sufficient to cause said impurity to have a high volatility relative to said chemical, the latter having a solubility in said solvent corresponding at least to the percentage of said chemical in said solvent-chemical azeotrope;

establishing, prior to the withdrawal of pure chemical from the lower portion of said solvent removal zone, and maintaining from plate to plate a substantially constant concentration of solvent on a majority of the plates in said extractive distillation zone, said concentration being in the range of from about 40 to about 90 mol percent;

maintaining at a point within said solvent removal zone a temperature above the boiling point of said solvent but below the boiling point of the solvent-free chemical so that solvent-free chemical is produced as bottoms;

removing overhead from the azeotropic distillation zone a distillate of the solvent-impurity azeotrope;

after said concentration has been established, adding solvent to said column in an amount corresponding substantially to the volume of said solvent dissolved in the impurity in said distillate; and withdrawing from the bottom of said solvent removal zone a stream of said chemical substantially free of said impurity and solvent.

5. In a process for the separation and purification of the components of a mixture of a normally liquid organic chemical containing impurities, which mixture cannot be satisfactorily separated and purified by simple fractionation methods, the improvement which comprises introducing said mixture and a solvent for said chemical into a distillation column having the following zones therein, said solvent being substantially inert with respect to the components of said mixture:

an azeotropic distillation zone extending from the feed plate of said column to the top thereof;

an extractive distillation zone extending from the feed plate down to a lower level of said column but above the reboiler section thereof; and a solvent removal zone, the upper boundary of which is adjacent the lower limit of said extractive distillation zone and the lower boundary of said solvent removal zone being the base of said column, the solvent employed being lower boiling than the chemical to be purified and forming a minimum boiling azeotrope with said impurities, said solvent also being capable of forming an azeotrope with said impurities lower boiling than any other distillable fraction of said mixture having at least one component, the concentration of the solvent in said solvent-impurities azeotrope being sufficient to cause said impurities to have a high volatility relative to said chemical;

establishing, prior to the withdrawal of pure chemical from the lower portion of said solvent removal zone, and maintaining from plate to plate a substantially constant concentration of liquid solvent on a majority of the plates in said extractive distillation zone, said concentration being in the range of from about 40 to about 90 mol percent;

maintaining at a point within said solvent removal zone a temperature above the boiling point of said solvent but below the boiling point of the solvent-free chemical so that solvent-free chemical is produced as bottoms; and withdrawing from the bottom of said solvent removal zone a stream of said chemical substantially free of said impurities and solvent.

6. In a process for the separation and purification of the components of a mixture of a normally liquid organic chemical containing impurities, which mixture cannot be satisfactorily separated and purified by simple fractionation methods, the improvement which comprises introducing said mixture and a solvent for said chemical into a distillation column having the following zones therein, said solvent being substantially inert with respect to the components of said mixture:

an azeotropic distillation zone extending from the feed plate of said column to the top thereof;

an extractive distillation zone extending from the feed plate down to a lower level of said column but above the reboiler section thereof; and a solvent removal zone, the upper boundary of which is adjacent the lower limit of said extractive distillation zone and the lower boundary of said solvent removal zone being the base of said column, the solvent employed being lower boiling than the chemical to be purified and forming a minimum boiling azeotrope with said impurities but not forming an azeotrope with said chemical, said impurities being immiscible in said solvent, the concentration of the solvent in said solvent-impurities azeotrope being sufficient to cause said impurities to have a high volatility relative to said chemical, the latter being miscible in all proportions with said solvent in said extractive distillation zone;

establishing, prior to the withdrawal of pure chemical from the lower portion of said solvent removal zone, and maintaining from plate to plate a substantially constant concentration of liquid solvent on a majority of the plates in said extractive distillation zone, said concentration being in the range of from about 40 to about 90 mol percent;

maintaining at a point within said solvent removal zone a temperature above the boiling point of said solvent but below the boiling point of the solvent-free chemical so that solvent-free chemical is produced as bottoms;

removing overhead from the azeotropic distillation zone a distillate of the solvent-impurities azeotrope, allowing said distillate to stratify into two layers and returning the solvent layer to said azeotropic distillation zone;

after said concentration has been established, adding solvent to said column in an amount corresponding substantially to the volume of said solvent dissolved in the impurities layer of said distillate; and withdrawing from the bottom of said solvent removal zone a stream of said chemical substantially free of said impurities and solvent.

7. In a process for the separation and purification of the components of a mixture of a normally-liquid organic chemical containing impurities, which mixture cannot be satisfactorily separated and purified by simple fractionation methods, the improvement which comprises introducing said mixture and a solvent for said chemical into a distillation column having the following zones therein, said solvent being substantially inert with respect to the components of said mixture:

an azeotropic distillation zone extending from the feed plate of said column to the top thereof;

an extractive distillation zone extending from the feed plate down to a lower level of said column but above the reboiler section thereof; and a solvent removal zone, the upper boundary of which is adjacent the lower limit of said extractive distillation zone and the lower boundary of said solvent removal zone being the base of said column, the solvent employed being lower boiling than the chemical to be purified and forming a minimum boiling azeotrope with said impurities but not forming an azeotrope with said chemical, said impurities being miscible in said solvent, the concentration of the solvent in said solvent-impurities azeotrope being sufficient to cause said impurities to have a high volatility relative to said chemical, the latter being miscible in all proportions with said solvent in said extractive distillation zone;

establishing, prior to the withdrawal of pure chemical from the lower portion of said solvent removal zone, and maintaining from plate to plate a substantially constant concentration of liquid solvent on a majority of the plates in said extractive distillation zone, said concentration being in the range of from about 40 to about 90 mol percent;

maintaining at a point within said solvent removal zone a temperature above the boiling point of said solvent but below the boiling point of the solvent-free chemical so that solvent-free chemical is produced as bottoms;

removing overhead from the azeotropic distillation zone a distillate of the solvent-impurities azeotrope;

after said concentration has been established, adding solvent to said column in an amount corresponding substantially to the volume of said solvent dissolved in the impurities in said distillate; and withdrawing from the bottom of said solvent removal zone a stream of said chemical substantially free of said impurities and solvent.

8. The process of claim 4 in which water is employed as the solvent.

9. The process of claim 4 in which ethanol is employed as the solvent.

10. The process of claim 4 in which solvent azeotropes of said chemical or chemicals and impurities are taken overhead, allowed to form a liquid phase consisting essentially of said impurities and a separate solvent phase containing said chemical or chemicals substantially free from said impurities, and said solvent phase is returned to the column as reflux.

11. The process of claim 4 in which the chemical to be purified is a water-miscible aliphatic carboxylic acid capable of forming an azeotrope with water and wherein the solvent employed is water.

12. The process of Claim 5 in which the chemical to be purified is 2-pentanone and the solvent employed is ethanol.

13. The process of claim 4 in which propionic acid is the carboxylic acid to be purified.

14. The process of claim 4 in which a butyric acid is the carboxylic acid to be purified.

15. The process of claim 4 in which n-butyric acid is the carboxylic acid to be purified.

16. The process of claim 4 in which a mixture of propionic acid and a butyric acid is employed as the carboxylic acid component to be purified.

17. The process of claim 4 in which there is employed a mixture of water-miscible aliphatic acids comprising proponic acid and n-butyric acid wherein the latter is present in a concentration of at least 25 weight percent.

References Cited by the Examiner

Benedict et al.: "Extractive and Azeotropic Distillation," from Transactions of American Institute of Chemical Engineers, June 24, 1945 (pp. 353–370).

Pery: "Chemical Engineer's Handbook," 3rd Edition, 1950 (pp. 634, 644, 651, 652).

NORMAN YUDKOFF, *Primary Examiner.*

UNITED STATES PATENT OFFICE
CERTIFICATE OF CORRECTION

Patent No. 3,214,347                                               October 26, 1965

Howard Grekel et al.

It is hereby certified that error appears in the above numbered patent requiring correction and that the said Letters Patent should read as corrected below.

In the grant, line 1, and in the heading to the printed specification, line 3, for "Karol L. Hujsack", each occurrence, read -- Karol L. Hujsak --; column 5, line 39, for "aqueous" read -- adequate --; column 7, line 49, for "940" read -- (940 --; column 12, line 13 and column 13, line 36, for "azeotrope", each occurrence, read -- azeotropic --; column 16, line 57, for "proponic" read -- propionic --.

Signed and sealed this 16th day of August 1966.

(SEAL)
Attest:

ERNEST W. SWIDER                                            EDWARD J. BRENNER
Attesting Officer                                                 Commissioner of Patents